United States Patent
Barge et al.

(10) Patent No.: US 10,922,433 B2
(45) Date of Patent: Feb. 16, 2021

(54) INTERRUPTING RECEIPT OF SENSITIVE INFORMATION

(71) Applicant: Wells Fargo Bank, N.A., San Francisco, CA (US)

(72) Inventors: Richard Barge, San Francisco, CA (US); Lila Fakhraie, Belmont, CA (US); Tammy C. Fleming, Maple Grove, MN (US); Chris Kalaboukis, San Jose, CA (US); Kristine Ing Kushner, Orinda, CA (US); Lane Mortensen, San Francisco, CA (US); Karen L. Shahoian, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 123 days.

(21) Appl. No.: 16/199,930

(22) Filed: Nov. 26, 2018

(65) Prior Publication Data
US 2020/0167499 A1 May 28, 2020

(51) Int. Cl.
| | | |
|---|---|---|
| G06F 21/00 | (2013.01) | |
| G06F 21/62 | (2013.01) | |
| G06F 21/60 | (2013.01) | |
| G06F 21/32 | (2013.01) | |
| G10L 17/06 | (2013.01) | |
| G10K 11/178 | (2006.01) | |
| G10L 17/00 | (2013.01) | |

(52) U.S. Cl.
CPC .......... *G06F 21/6245* (2013.01); *G06F 21/32* (2013.01); *G06F 21/604* (2013.01); *G10K 11/17823* (2018.01); *G10K 11/17827* (2018.01); *G10L 17/00* (2013.01); *G10L 17/06* (2013.01); *G10K 2210/3044* (2013.01)

(58) Field of Classification Search
CPC ...... G06F 21/6245; G06F 21/10; G06F 21/32; G06F 21/604; G10L 17/005
See application file for complete search history.

(56) References Cited

U.S. PATENT DOCUMENTS

| | | |
|---|---|---|
| 7,672,845 B2 | 3/2010 | Beranek et al. |
| 8,347,380 B1 | 1/2013 | Satish et al. |
| 8,464,352 B2 | 6/2013 | Toomey |

(Continued)

OTHER PUBLICATIONS

Schwarz et al., "KeyDrown: Eliminating Keystroke Timing Side-Channel Attacks", Association for Computing Machinery, 2017. 16 pages.

*Primary Examiner* — Hosuk Song
(74) *Attorney, Agent, or Firm* — Foley & Lardner LLP

(57) ABSTRACT

Systems and methods for interrupting disclosure of sensitive information are described. Sensitive information data associated with a user is maintained. A primary device detects commencement of a voice input to a secondary device. As the voice input is detected by the primary device, the voice input is analyzed to determine the content of the voice input. The content is compared to the sensitive information data to determine whether the voice input contains sensitive information. When the primary device determines the voice input contains sensitive information, a speaker of the primary device is controlled to generate a noise canceling signal which interrupts receipt of further sensitive information by the secondary device.

23 Claims, 3 Drawing Sheets

(56) References Cited

U.S. PATENT DOCUMENTS

| | | | |
|---|---|---|---|
| 8,713,677 B2 | 4/2014 | Soghoian et al. | |
| 8,812,319 B2 * | 8/2014 | Skerpac | G10L 17/005 |
| | | | 704/246 |
| 9,038,167 B2 * | 5/2015 | Fadell | H04W 12/0605 |
| | | | 726/19 |
| 9,043,210 B1 * | 5/2015 | Adcock | G06F 21/32 |
| | | | 704/275 |
| 9,147,395 B2 | 9/2015 | Kim et al. | |
| 9,472,206 B2 | 10/2016 | Ady | |
| 9,503,579 B2 | 11/2016 | Watson et al. | |
| 9,699,317 B1 | 7/2017 | Pycko et al. | |
| 9,787,835 B1 | 10/2017 | Pycko et al. | |
| 10,146,923 B2 * | 12/2018 | Pitkanen | H04L 63/0861 |
| 2008/0307529 A1 | 12/2008 | Choi et al. | |
| 2009/0100184 A1 | 4/2009 | Chakra et al. | |
| 2014/0245457 A1 | 8/2014 | Qi et al. | |
| 2015/0281446 A1 | 10/2015 | Milstein et al. | |
| 2016/0006760 A1 | 1/2016 | Lala et al. | |
| 2016/0104145 A1 | 4/2016 | Critchley et al. | |
| 2019/0074002 A1 * | 3/2019 | Christopher | G10K 11/178 |

\* cited by examiner

INTERRUPTING RECEIPT OF SENSITIVE INFORMATION

BACKGROUND

The present disclosure relates generally to protection of sensitive information. More specifically, the present disclosure relates to interrupting receipt of sensitive information by electronic devices.

Many people depend on digital assistants for day-to-day tasks and activities. Some digital assistants may be embodied on a mobile device. Additionally, some digital assistants may be embodied on a dedicated at-home device. A user can interact with the digital assistant using the mobile device or the at-home device. Typically, a user utters a wake-up phrase followed by a natural language voice input including a command to perform a task. The digital assistant may then interpret the natural language voice input to identify the command and perform the task. Users can perform various tasks via their digital assistants including sending messages or emails, adding calendar entries, taking notes, ordering goods or services, etc.

As users become more dependent on their digital assistants, they may begin to feel overly comfortable with their digital assistant. For instance, users may disclose sensitive information to their digital assistant. As one example, a digital assistant may issue a prompt for information so the digital assistant can execute a command requested by the user. The digital assistant may request, for instance, the user's address, the user's phone number, the user's social security number, a password, etc. The user may then provide this type of information to the digital assistant. While in some instances such a disclosure may be safe, such information may still be intercepted by third-parties or otherwise used in an unauthorized manner.

SUMMARY

At least one embodiment relates to a method. The method includes maintaining sensitive information data associated with a user. The method includes receiving a vocalization at a primary device and at a secondary device. The method includes analyzing, by the primary device, the vocalization to determine a content of the vocalization. The method includes comparing the content of the vocalization to the sensitive information data to determine whether the vocalization contains at least some sensitive information. The method includes controlling, based on determining that the voice input contains some sensitive information, a speaker of the primary device to output a noise canceling sound configured to prevent the secondary device from receiving any subsequently vocalized sensitive information.

Another embodiment relates to a system. The system includes a microphone configured to detect voice inputs from a person to a secondary device. The system includes at least one speaker configured to output noise canceling sounds. The system includes a computing system including a processing circuit, and the processing circuit includes a processor and memory. The memory is structured to store instructions that, when executed by the processor, cause the processor to receive, by the microphone, a vocalization from the person to the secondary device. The memory further stores instructions that, when executed by the processor, cause the processor to analyze the vocalization to determine a content of the vocalization. The memory further stores instructions that, when executed by the processor, cause the processor to compare the content to sensitive information data associated with a user to determine whether the vocalization contains at least some sensitive information. The memory further stores instructions that, when executed by the processor, cause the processor to control a speaker of the primary device to output a noise canceling sound based on determining that the voice input contains some sensitive information. The noise canceling sound is configured to prevent the secondary device from receiving any subsequently vocalized sensitive information.

Another embodiment relates to a method. The method includes maintaining sensitive information data associated with a user. The method includes receiving a vocalization at a primary device and at a secondary device. The method includes analyzing, by the primary device, the vocalization to determine a content of the vocalization and an expected content of a second vocalization expected to be vocalized following the first vocalization. The method includes determining that the second vocalization is expected to contain sensitive information based on at least one of a comparison of the content of the first vocalization to the sensitive information data and a context of the first vocalization. The method includes controlling, based on determining the second vocalization is expected to contain sensitive information, a speaker of the primary device to output a noise canceling signal configured to prevent the secondary device from receiving the second vocalization.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Individuals often provide vocalizations to their digital assistant. In some instances, the vocalizations may include sensitive information, such as passwords, personally identifiable information, financial information, social security numbers, etc. These individuals may inadvertently or purposefully disclose such sensitive information without understanding possible negative implications of the disclosure.

The embodiments described herein prevent receipt of the sensitive information, thus mitigating the negative implications. The embodiments described herein are configured to analyze vocalizations provided by an individual to a secondary device (such as a secondary device including, operating, or otherwise executing a digital assistant). The embodiments described herein are configured to control a speaker to output a noise canceling sound to prevent receipt of the sensitive information.

The embodiments described herein solve the technical problem of securing sensitive information. The embodiments solve the problem by analyzing the vocalization to determine whether they contain (or whether subsequent vocalization will likely contain) sensitive information, and controlling a speaker to output the noise canceling sound to prevent receipt of any further sensitive information. Such embodiments are not performable by conventional computing systems or humans because other people or typical computing systems are unaware of a user's sensitive information, and thus, conventional computing systems and humans would not be able to determine when a vocalization contains sensitive information. Rather, the embodiments described in the present disclosure maintain information pertaining to a user's sensitive information, and interrupts receipt of sensitive information by third parties when the sensitive information is detected in a vocalization.

Figure 1:
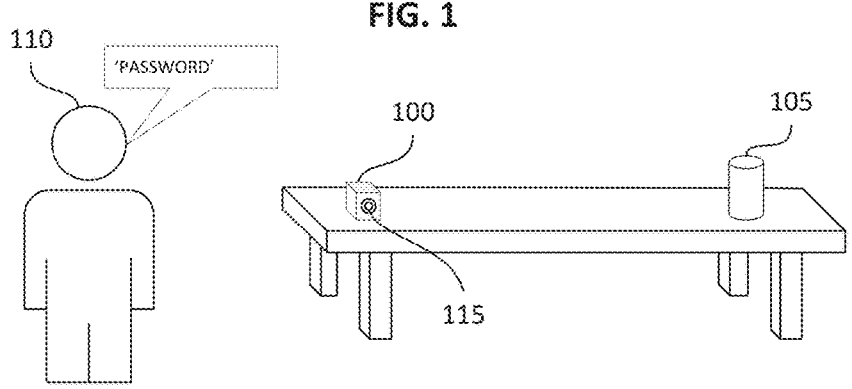
FIG. 1 is an example environment including a sensitive information interruption device and a secondary device, according to an exemplary embodiment.

Referring to FIG. 1, an example environment including a sensitive information interruption device 100 (referred to hereinafter as a "primary device") and a secondary device 105 is shown according to an exemplary embodiment. The secondary device 105 may be a standalone device separate from the primary device 100. For instance, the secondary device 105 may include or enable a user 110 to interact with a digital assistant. The secondary device 105 may be similar to those provided by AMAZON®, APPLE®, GOOGLE®, MICROSOFT®, etc. which embodies their digital assistants, ALEXA®, SIRI®, GOOGLE® Assistant, and CORTANA®, respectively. As one example, the secondary device 105 may be a mobile device associated with the user 110. Additionally, the secondary device 105 may be a dedicated at-home device (e.g., an AMAZON ECHO®, a GOOGLE HOME®, etc.). The primary device 100 is configured to generate a noise canceling signal that cancels the voice of the user 110 when the user is vocalizing sensitive information, thereby interrupting or otherwise preventing the secondary device 110 from receiving the sensitive information. The primary device 100 maintains sensitive information data associated with the user 110. The sensitive information may be, for instance, passwords, social security numbers, medical information, financial information, etc. The primary device 100 may detect commencement of a vocalization by the user 110 to the secondary device 105. As the vocalization is detected by the primary device 100, the primary device 100 analyzes the vocalization from the user 110 to determine content of the vocalization. The primary device 100 determines whether the vocalization contains sensitive information based on the content of the vocalization. When the primary device 100 determines that the vocalization contains sensitive information, or determines that a future vocalization will contain sensitive information (e.g., the vocalization is "My password is . . . "), or determines that the vocalization contains a first part of sensitive information (e.g., the first three letters of the social security number of the user 110), the primary device 100 controls a speaker 115 to generate a noise canceling signal that interrupts receipt of further sensitive information by the secondary device 105 (e.g., the next vocalizations of the user 110, the second part of the sensitive information, such as the last six letters of the social security number of the user 110).

The embodiments described herein may provide additional protection to users who inadvertently disclose sensitive information. For instance, the embodiments described herein prevent a user from inadvertently disclosing sensitive information to a secondary device 105 (such as a digital voice assistant embodied on a standalone device) by generating a noise canceling signal that interrupts receipt of further sensitive information by the secondary device 105. The embodiments described herein may inform a user 110 that they are disclosing sensitive information, which may educate the user 110. Various other benefits will become apparent according to the following disclosure.

Figure 2:
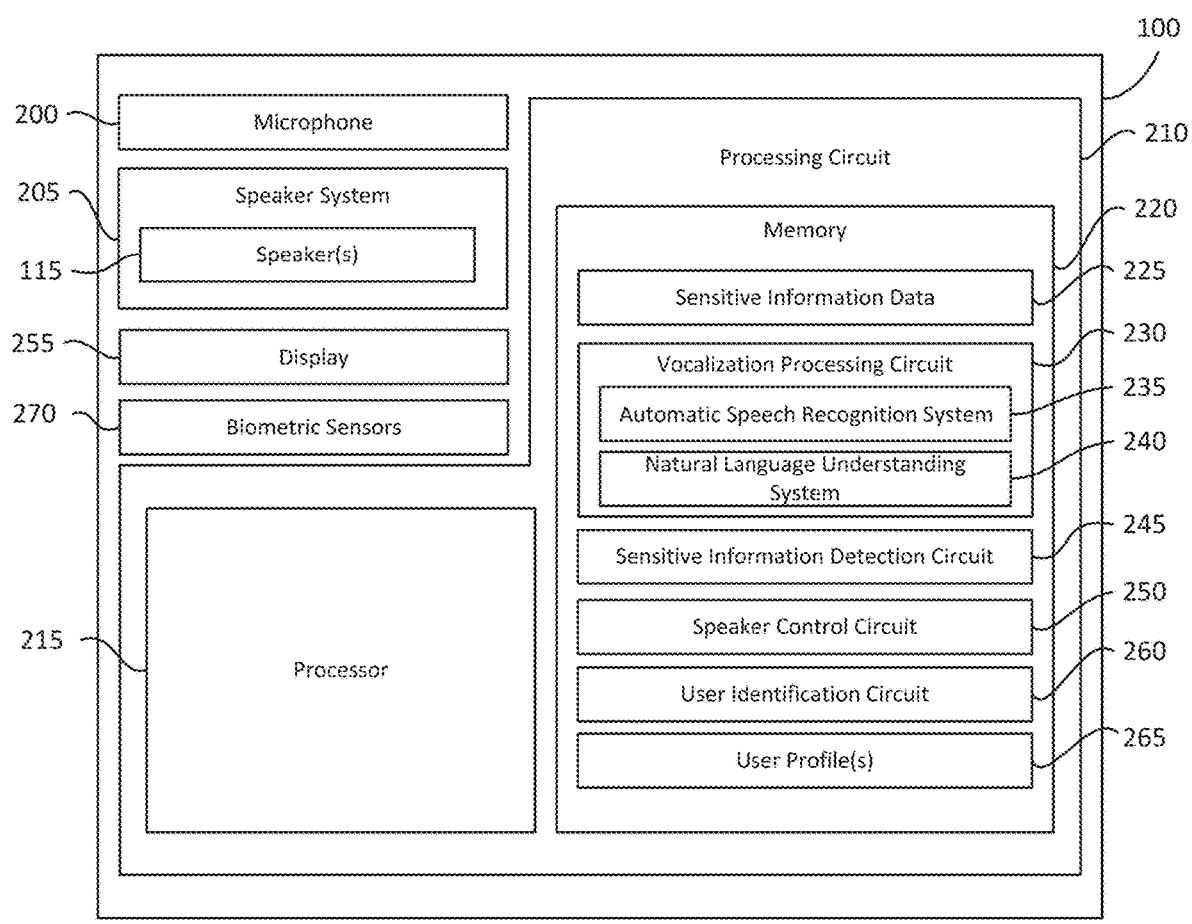
FIG. 2 is a schematic diagram of the sensitive information interruption device of FIG. 1, according to an exemplary embodiment.

Referring to FIG. 2, a schematic diagram of the primary device 100 is shown, according to an exemplary embodiment. In some embodiments, the primary device 100 may be embodied as a standalone device (as shown in FIG. 1). In other embodiments, the primary device 100 may be embodied on another device separate from the secondary device 105. For instance, the primary device 100 may be embodied on a smartphone or other mobile device, a standalone device including a digital assistant, etc.

The primary device 100 is shown to include a microphone 200. The microphone 200 may be a sensor configured to detect sounds from an external environment, such as the environment depicted in FIG. 1. The microphone 200 may be sensitive to frequencies in the voice frequency spectrum (e.g., approximately 85 Hz to 255 Hz). The microphone 200 may include various filters to remove or cancel background noise. Accordingly, the microphone 200 may be tuned or otherwise configured to detect spoken (e.g., voice) inputs from a user 110.

The primary device 100 is shown to include a speaker system 205 including at least one speaker 115. The speaker system 205 may be configured to control the speaker(s) 115 to output various sounds in the external environment, such as the environment depicted in FIG. 1. The speaker system 205 may receive one or more signals from various components or elements described herein, and output sound via the speaker(s) 115. Such sounds may distort other sounds in the external environment, such as spoken words, syllables, or characters by the user 110. These sounds may prevent other devices, such as the secondary device 105, from detecting or otherwise discerning content of the spoken words, syllables, or characters by the user 110.

The primary device 100 is shown to include a processing circuit 210. The processing circuit 210 includes a processor 215 and memory 220. The memory 220 includes one or more circuits. As will be discussed in further detail below, the circuits described herein may include hardware structured to execute functions described herein. In some embodiments, each respective circuit may include machine-readable media for configuring the hardware (e.g., the processor 215) to execute the functions described herein. While shown as embodied on the memory 220, in some embodiments, at least some of the circuits described herein may be located remotely from the processor 215. In these embodiments, the processor 215 may access or otherwise execute the functions associated with these circuits via respective communications device on a network (e.g., a Local Area Network [LAN], Wide Area Network [WAN], Wireless Local Area Network [WLAN], Internet Area Network [IAN], cloud-based network, etc.).

The memory 220 is shown to store sensitive information data 225. The sensitive information data 225 may be or include data which corresponds to sensitive information associated with one or more users. "Sensitive information" as used throughout this disclosure means information which is to be protected against unwarranted or unwanted disclosure. Various examples of sensitive information includes personally identifiable information, such as name, social security number (or last four digits of a social security number), passport or driver's license number, credit card numbers, digital identity, telephone number, home address, email address, vehicle registration plate number, date of birth, birthplace, telephone number, etc., passwords, usernames, etc. In some embodiments, sensitive information may include log-in information for a bank account associated with a user (e.g., a password for a bank account for a user). While these examples are provided, the present disclosure is not limited to these particular examples. Rather, the present disclosure includes any type of information which a user would generally not disseminate to the public.

In some embodiments, the memory 220 may store sensitive information data 225 for several users. For instance, in a household, the memory 220 may store sensitive information data 225 for each member of the household.

The sensitive information data 225 may be provided to the primary device 100 by a user (e.g., user 110). The user may log onto a secure website or web portal associated with the primary device 100. The user may input various sensitive information to the secure website or web portal, such as the sensitive information described above. The sensitive information data 225 corresponding to the inputs provided by the user may then be stored in the memory 220. In some embodiments, the sensitive information data 225 may be stored on memory 220 located remote from the primary device 100. Accordingly, while the present disclosure describes the memory 220 being local, in some embodiments, the memory 220 (or one or more components of the memory 220 described herein) may be stored remote from the primary device 100 and accessible by the various components described herein via respective communications devices.

In some embodiments, the sensitive information data 225 may be encrypted when the user inputs their sensitive information to the secure website or web portal. The sensitive information data 225 may be encrypted according to various methods, such as symmetric encryption, asymmetric encryption, hashing, etc. Accordingly, the sensitive information data 225 may be protected from unauthorized access.

The memory 220 is shown to include a vocalization processing circuit 230. The vocalization processing circuit 230 may be a circuit implemented to perform functions related to the processing and analysis of vocalizations provided by a user (e.g., user 110). The vocalizations provided by the user may be directed to the secondary device 105 (of FIG. 1) rather than the primary device 100. The vocalizations may be detected by the microphone 200, and the signal corresponding to the vocalization generated by the microphone 200 may be communicated to the vocalization processing circuit 230. Accordingly, the vocalization processing circuit 230 may be implemented to perform functions related to a vocalization provided by the user to a device separate from the primary device 100. The vocalization processing circuit 230 may monitor the vocalizations from the user to a device which is separate from the primary device 100, such as the secondary device 105.

The vocalization processing circuit 230 may include various instructions for converting the signal corresponding to the vocalization from speech to text. For instance, the vocalization processing circuit 230 may include an automatic speech recognition (ASR) system 235. The ASR system 235 may include various circuitry or other components configured to translate spoken words to text. The ASR system 235 may implement or use various algorithms, such as hidden Markov models, neural networks, etc., to convert spoken words to text.

The vocalization processing circuit 230 may include various instructions for interpreting the text. For instance, the vocalization processing circuit 230 may include a natural language understanding (NLU) system 240. The NLU system 240 may use the text from the ASR system 235 and various contextual queues for understanding the meaning of the vocalization from the user. The NLU system 240 may include various grammars for performing part-of-speech tagging, segmenting, and parsing a given vocalization. Accordingly, the vocalization processing circuit 230 may generally include various components to determine the content of a vocalization spoken by a user. While the above-described systems are used in some embodiments, the vocalization processing circuit 230 may include other components or systems for determining the content of a vocalization.

The vocalization processing circuit 230 may detect commencement of a vocalization from a user. The vocalization processing circuit 230 may detect commencement of the vocalization when data is generated by the microphone 200. The vocalization processing circuit 230 may begin interpreting the vocalization from the user as the vocalization is received. Accordingly, the vocalization processing circuit 230 may analyze the vocalization in real-time or near real-time.

The memory 220 is shown to include a sensitive information detection circuit 245. The sensitive information detection circuit 245 may be a circuit implemented to perform various functions related to detection of sensitive information within a vocalization. The sensitive information detection circuit 245 may compare the content identified via the vocalization processing circuit 230 to the sensitive information data 225 to determine whether the vocalization contains any sensitive information.

The sensitive information detection circuit 245 may detect various characters of a vocalization from a user (e.g., as identified by the vocalization processing circuit 230). The sensitive information detection circuit 245 may compare each of the characters and their sequence to the sensitive information data 225 as they are identified. The sensitive information detection circuit 245 may access the sensitive information data 225 and compare the sequence of characters from the vocalization to each (or a subset) of a plurality of data entries of the sensitive information data. As one example, where a vocalization includes the sequence "four two," the sensitive information detection circuit 245 may access the sensitive information data 225 and identify data entries within the sensitive information data 225 that include (or begin with) the sequence "four two."

In some embodiments, the sensitive information detection circuit 245 may flag vocalizations that specifically contain individual characters (as opposed to spoken words). The sensitive information detection circuit 245 may flag these vocalizations because they may be more likely to contain sensitive information (e.g., a password, a social security number, a credit card number, etc.).

The sensitive information detection circuit 245 may compare a number of consecutive matching characters (e.g., characters contained in a vocalization that match characters in sensitive information as identified in the sensitive information data 225) to a threshold. The threshold may be a predetermined number of characters used to discern random vocalizations which may include individual characters to vocalizations that contain sensitive information.

In some embodiments, the threshold may be set based on the type of sensitive information. As one example, a social security number (which typically includes nine digits) may have a threshold of three characters. As another example, a credit card number (which typically includes 15-16 digits) may have a threshold of four characters. As still another example, a telephone number (which includes ten digits excluding country code) may have a threshold of five digits.

In some embodiments, the threshold may be dynamic based on the type of sensitive information. For instance, a home address typically includes a series of numbers representing a house number followed by the street name (e.g., "123 Main Street"). However, many streets use a different number of digits for identifying specific houses. Accordingly, the threshold for a home address may be dynamic based on the home address provided by the user. For instance, the threshold may be the number of digits for the house number, the number of digits and the start of the street name (e.g., "Main" from the example above), etc. As another example, a password may have a varying number of characters. The threshold for a password may be dynamic based on the number of characters (e.g., three characters for a password containing eight characters, four characters for a password containing ten characters, etc.).

In each of these embodiments, the sensitive information detection circuit 245 may identify when a vocalization contains sensitive information by comparing the content of the vocalization to sensitive information data 225. The sensitive information detection circuit 245 (and therefore the primary device 100) may be passive in that, when the sensitive information detection circuit 245 does not identify any sensitive information in a vocalization, the sensitive information detection circuit 245 does not perform any further functions (e.g., the primary device 100 is maintained in an idle state). In this regard, the primary device 100 may perform further functions when the sensitive information detection circuit 245 identifies sensitive information in a vocalization from a user. When the sensitive information detection circuit 245 identifies a vocalization that contains a sequence of characters (or characters and text) including sensitive information, the primary device 100 may perform one or more functions as described below.

The memory 220 is shown to include a speaker control circuit 250. The speaker control circuit 250 may be a circuit implemented to perform various functions related to the control of the speaker system 205 and/or speaker(s) 115. The speaker control circuit 250 may be communicably coupled to the speaker system 205 and/or the speaker(s) 115. The speaker control circuit 250 may provide signals to the speaker system 205 and/or speaker(s) 115 which cause the speaker(s) 115 to disburse sound in the environment. For instance, the speaker control circuit 250 may store various signals which are associated with sounds to disburse from the speaker(s) 115 into the external environment (such as depicted in FIG. 1). In some embodiments, the sound disbursed from the speaker(s) 115 may interrupt receipt of a vocalization by another device located in the external environment, such as the secondary device 105. In some embodiments, the sound disbursed from the speaker(s) 115 may correspond to a prompt directed to the user regarding the vocalization including sensitive information. In each of these embodiments, these signals may be communicated to the speaker 115 (e.g., through the speaker system 205) and cause the speaker 115 to disburse the corresponding sound in the environment. These and other embodiments will be discussed in turn below.

The speaker control circuit 250 may store a noise canceling signal. The noise canceling signal may be a signal that, when communicated to the speaker system 205, causes the speaker(s) 115 to output a sound that interrupts further receipt of sensitive information by other devices located in the environment of the primary device 100. The speaker control circuit 250 may be communicably coupled to the sensitive information detection circuit 245. When the sensitive information detection circuit 245 identifies a vocalization that contains a sequence of characters (or characters and text) that includes sensitive information, the speaker control circuit 250 may automatically provide the noise canceling signal to the speaker system 205.

The speaker control circuit 250 may provide the noise canceling signal to the speaker system 205 prior to the user speaking the entirety of the sensitive information associated with the data entry which the sensitive information detection circuit 245 identified within the vocalization. Accordingly, the sensitive information detection circuit 245 may identify that vocalization contains an initial portion of sensitive information, and the speaker control circuit 250 may provide the noise canceling signal to the speaker system 205 prior to the user speaking the entirety of the sensitive information. The speaker(s) 115 may output the noise canceling sound which interrupts the receipt of the remaining portion of the sensitive information from the data entry.

As one example, where the user begins to speak a password having eight characters (for instance, p-a-s-s-w-o-r-d), the sensitive information detection circuit 245 may identify the vocalization as containing sensitive information when the user speaks an initial portion of the sensitive information (e.g., "p-a-s"). The speaker control circuit 250 may provide the noise canceling signal to the speaker system 205, and the speaker(s) 115 may output the noise canceling sound to interrupt the receipt of the remaining portion of the sensitive information (e.g., "s-w-o-r-d").

As another example, where the user begins to speak a social security number having 9 digits (e.g., 123-45-6789), the sensitive information detection circuit 245 may identify the vocalization as containing sensitive information when the user speaks an initial portion of the sensitive information (e.g., "1-2-3"). The speaker control circuit 250 may provide the noise cancelling signal to the speaker system 205, and the speaker(s) 115 may output the noise canceling sound to interrupt the receipt of the remaining portion of the sensitive information (e.g., "45-6789"). In each of these examples, the sensitive information detection circuit 245 and speaker control circuit 250 together interrupt receipt of sensitive information to another device located in the environment of the primary device, such as the secondary device 105. Such embodiments may prevent or inhibit inadvertent receipt of sensitive information by other devices located in the environment of the primary device 100. These embodiments may protect the user from identity theft. Additionally, these embodiments may educate the user such that the user may become more conscientious of when (and where) they provide sensitive information, and to whom or what they provide sensitive information.

In some embodiments, the speaker control circuit 250 may store a notification signal. The notification signal may be a signal that, when communicated to the speaker system 205, causes the speaker(s) 115 to output a sound that corresponds to a notification directed to the user. In this embodiment, the notification may alert the user that the user was disclosing sensitive information. In some embodiments, the notification may be an audio message which indicates that the user was disclosing sensitive information (e.g., "Do you know that you were disclosing sensitive information?"). The audio message may be prerecorded from, for instance, a celebrity. In some embodiments, the speaker control circuit 250 may also store a display signal. The display signal may control a display 255 to output visual feedback along with the audio message (e.g., the notification may be an audio/visual notification).

In some embodiments, the speaker control circuit 250 may store a prompt signal. The prompt signal may be a signal that, when communicated to the speaker system 205, causes the speaker(s) 115 to output a sound that solicits information from the user. For instance, the sound may be an audio prompt which asks the user to authorize the disclosure of the sensitive information (e.g., "Do you wish to provide this sensitive information?"). The user may respond in natural language form (e.g., "Yes, I want to proceed."). The user's response may be detected by the microphone 200 and interpreted by the vocalization processing circuit 230. Where the user wishes to proceed (e.g., the user does not believe the information they are disclosing is sensitive), the sensitive information detection circuit 245 may be temporarily disabled and/or bypassed such that the speaker control circuit 250 does not communicate (or deactivates) the noise canceling signal. In this regard, the user may be warned that they are disclosing sensitive information and may proceed uninterrupted should they choose to do so.

In some instances, the user associated with particular sensitive information may not be the speaker (e.g., someone else is providing the sensitive information to another device in the environment of the primary device 100). In some embodiments, the prompt may be communicated to another device of the user. For instance, the primary device 100 may include a communications device which is communicably coupled to a mobile device associated with the user whose sensitive information is being disclosed. The prompt may be communicated to the mobile device. The user may then authorize (or not authorize) the disclosure of the sensitive information remotely. In this regard, the user may be safeguarded from unintended disclosure of sensitive information, even when the user is not around the primary device 100.

In some embodiments, the primary device 100 may be configured to detect who is speaking the voice prompt. For instance, the memory 220 may store a user identification circuit 260. The user identification circuit 260 may be a circuit implemented to perform various functions related to the identification of the user who spoke the vocalization. The memory 220 may store a number of user profile(s) 265. Each user profile(s) 265 may be associated with a particular user. Each user profile 265 may include corresponding characteristics which are used to identify the user. The user identification circuit 260 may compare detected characteristics of the speaker to those characteristics in the user profile(s) 265 to determine if the speaker is a known user. If the user identification circuit 260 does not have any (or enough) characteristics that match a user profile 265, the speaker may be identified as an unknown user.

The user identification circuit 260 may identify the user in a number of ways. As one example, the user identification circuit 260 may identify the speaker of the vocalization based on the speaker's voice. The user identification circuit 260 may include a speaker recognition system which is used to differentiate between different speakers. The speaker recognition system may identify acoustic patterns associated with a given speaker's speech characteristics (e.g., voice pitch, speaking style, etc.). The speaker recognition system may identify the speaker who spoke the vocalization based on the speaker's speech characteristics in comparison with speech characteristics associated with a given user profile 265. As another example, the user identification circuit 260 may identify the speaker based on various biometric information. The primary device 100 may include one or more biometric sensors 270. The biometric sensors 270 may be sensors that are configured to detect biometric features associated with a speaker. The biometric sensors 270 may be fingerprint sensors, iris scanners, face detection systems, etc. The user profile(s) 265 may include corresponding biometric data which are used to compare with data generated by the biometric sensors 270. The user identification circuit 260 may identify the speaker based on the comparison of the biometric data from a corresponding user profile 265 and the biometric data generated by the biometric sensors 270.

In some embodiments, each of the user profiles 265 may include corresponding security settings. For instance, a given user may have security settings associated with their preferences. The security settings may be settings for whether particular information is deemed sensitive to the user. As one example, a given user may provide security settings that indicate their email address is not sensitive when it is provided by them (or another specifically identified person), but their credit card number and social security number are always sensitive. As another example, a given user may provide security settings that indicate their home address is not sensitive, but their email address is sensitive. As another example, a given user may provide security settings to issue an authorization prompt to the user's mobile device so that the user can authorize (or not authorize) the disclosure of particular sensitive information on a case-by-case basis. The user may then authorize (or not authorize) the disclosure of the sensitive information remotely. Each of these security settings may be reflected in their corresponding user profiles. Users may provide these security settings when they input sensitive information to the secure website or web portal (e.g., to be stored in the sensitive information data 225).

In some embodiments, the speaker control circuit 250 may be configured to determine security settings associated with a given speaker to determine whether the speaker is permitted to disclose the sensitive information. When the user identification circuit 260 identifies the user who spoke the vocalization, the speaker control circuit 250 can identify security settings associated with the speaker (based on the user profile associated with the user). The speaker control circuit 250 may determine whether the user profile includes security settings pertaining to the particular sensitive information in the vocalization. The speaker control circuit 250 may control the speaker system 205 according to the security settings.

As one example, a user speaking a vocalization may have security settings which indicate that their home address is not deemed sensitive when spoken by the user. The user may provide a vocalization which includes their home address. The vocalization processing circuit 230 may process the vocalization to determine the content of the vocalization. Additionally, the user identification circuit 260 may analyze the vocalization to determine who is speaking the vocalization. The vocalization processing circuit 230 may determine the vocalization includes the home address which is sensitive information. The user identification circuit 260 may determine the speaker is the user whose home address is being spoken. The speaker control circuit 250 may, under some conditions, control the speaker system 205 to output the noise canceling sound to interrupt receipt of further sensitive information (e.g., additional details about the user's home address) by any devices in the environment of the primary device 100. However, since the speaker is the user whose home address is being spoken, and the user has security settings which indicate that their home address is not deemed sensitive when spoken by the user, the speaker control circuit 250 may be configured to refrain from communicating the noise canceling signal to the speaker system 205. In this regard, the speaker control circuit 250 may selectively regulate the disclosure of sensitive information based on various security settings and who is speaking a given vocalization.

As another example, a user who is not speaking a vocalization (e.g., a first user) may have security settings indicating their email address is deemed sensitive if spoken by anyone other than the user. Another user (e.g., a second user) may provide a vocalization which includes the first user's email address. The vocalization processing circuit 230 may process the vocalization to determine the content of the vocalization. Additionally, the user identification circuit 260 may analyze the vocalization to determine who is speaking the vocalization. The vocalization processing circuit 230 may determine the vocalization includes the first user's email address, which is sensitive information. The user identification circuit 260 may determine the speaker is not the first user (or any other known user). In this example, the speaker control circuit 250 may control the speaker system 205 to output the noise canceling sound to interrupt receipt of further sensitive information (e.g., the remaining portion of the email address) by any devices in the environment of the primary device 100.

As still another example, a user may have security settings indicating their social security number is always deemed sensitive. The user may provide a vocalization which includes the user's social security number. The vocalization processing circuit 230 may process the vocalization to determine the content of the vocalization. Additionally, the user identification circuit 260 may analyze the vocalization to determine who is speaking the vocalization. The vocalization processing circuit 230 may determine the vocalization includes the social security number which is sensitive information. The user identification circuit 260 may determine the speaker is the user. Even though the user is providing their own social security number, the speaker control circuit 250 may control the speaker system 205 to output the noise canceling sound to interrupt receipt of further sensitive information (e.g., the remaining portion of the user's social security number) by any devices in the environment of the primary device 100 based on the security settings.

As yet another example, a user who is not speaking a vocalization (e.g., a first user) may have security settings indicating their phone number is deemed sensitive if spoken by anyone other than the first user or the first user's spouse. Another user (e.g., a second user) may provide a vocalization which includes the first user's phone number. The vocalization processing circuit 230 may process the vocalization to determine the content of the vocalization. Additionally, the user identification circuit 260 may analyze the vocalization to determine who is speaking the vocalization. The vocalization processing circuit 230 may determine the vocalization includes the first user's phone number which is sensitive information. The user identification circuit 260 may determine the speaker is not the first user. However, the user identification circuit 260 may determine that the second user (e.g., the speaker) is the first user's spouse based on a user profile 265 for the first user's spouse. In this example, the speaker control circuit 250 may refrain from controlling the speaker system 205 to output the noise canceling sound so that the second user can provide the further sensitive information (e.g., the remaining portion of the first user's phone number) to the target device in the environment of the primary device 100.

While these examples are provided, it should be noted that the present disclosure is not limited to these particular examples. To the contrary, a given user may have a variety of settings based on who is providing the vocalization (e.g., themselves, other particular users, etc.), and what is the specific sensitive information contained in the vocalization.

Figure 3:
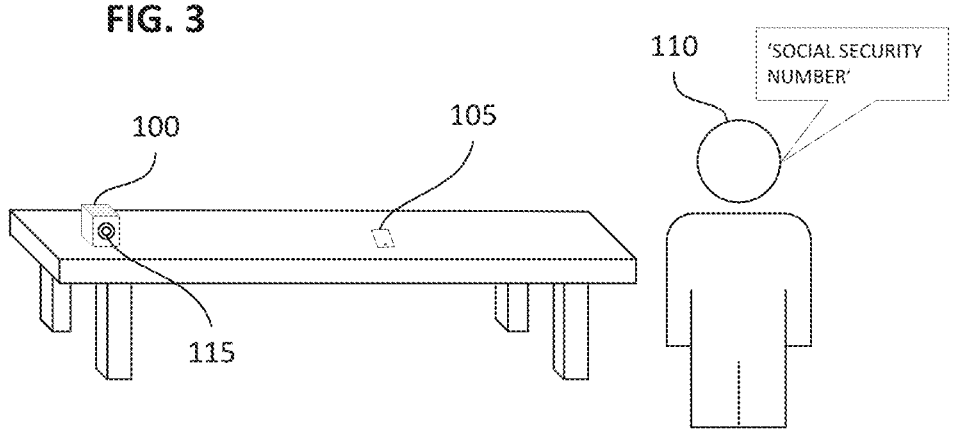
FIG. 3 is another example environment including a sensitive information interruption device and a secondary device, according to another exemplary embodiment.
Figure 4:
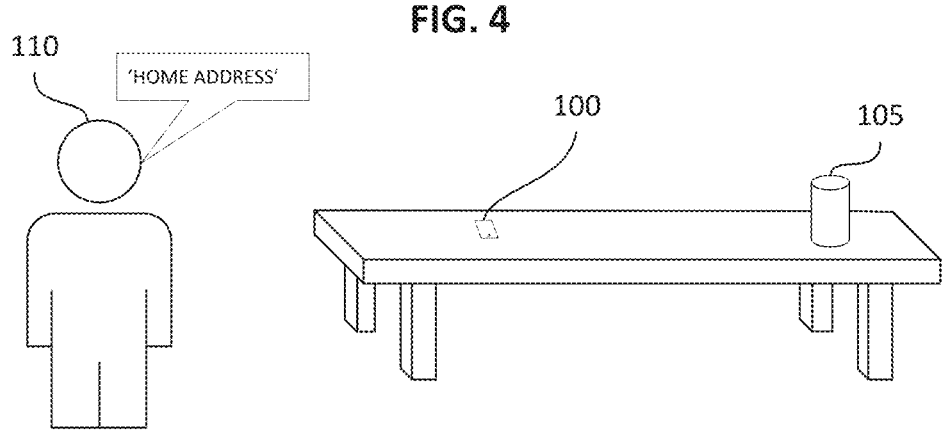
FIG. 4 is another example environment including a sensitive information interruption device and a secondary device, according to another exemplary embodiment.

Referring now to FIG. 3 and FIG. 4, additional environments including the primary device 100 and the secondary device 104 are shown according to exemplary embodiments.

Specifically, FIG. 3 shows an example environment where the secondary device 105 is the user's 110 mobile device. The secondary device 105 may include a digital assistant, such as SIRI®, ALEXA®, CORTANA®, etc. The user 110 may speak a wake-up phrase (e.g., "Hey, Siri"). The wake-up phrase may cause the secondary device 105 to exit a sleep mode and actively listen to the user 110. The user 110 may then interact with the secondary device 105. In some embodiments, the secondary device 105 may solicit various information from the user 110. The user 110 may provide various voice prompts in response to the solicitations from the secondary device 105. In the particular example depicted in FIG. 3, one voice prompt from the user 110 may include the user's 110 social security number. The primary device 100 may detect each of the voice prompts from the user 110. The vocalization processing circuit 230 of the primary device 100 may analyze these voice prompts to determine the contents of each of the voice prompts. Specifically, the vocalization processing circuit 230 may determine whether these vocalizations contain sensitive information. The sensitive information detection circuit 245 may detect an initial portion of the user's 110 social security number. The speaker control circuit 250 may communicate the noise canceling signal to the speaker system 205. The speaker(s) 115 may then output the noise canceling sound to interrupt further receipt of sensitive information (e.g., the remaining portion of the user's 110 social security number) by the secondary device 105 (e.g., the user's 110 mobile device).

FIG. 4 shows an example environment where the primary device 100 is embodied on the user's 110 mobile device. In this example, the secondary device 105 may be a device similar to the device described in FIG. 1. Accordingly, the secondary device 105 may include a digital assistant, such as SIRI®, ALEXA®, CORTANA®, etc. The user 110 may speak a wake-up phrase (e.g., "ALEXA"). The wake-up phrase may cause the secondary device 105 to exit a sleep mode and actively listen to the user 110. The user 110 may then interact with the secondary device 105. In some embodiments, the secondary device 105 may solicit various information from the user 110. The user 110 may provide various voice prompts in response to the solicitations from the secondary device 105. In the particular example depicted in FIG. 4, one voice prompt from the user 110 may include the user's 110 home address. The primary device 100 (e.g., the user's 110 mobile device) may detect each of the voice prompts from the user 110. The vocalization processing circuit 230 of the primary device 100 may analyze these voice prompts to determine the contents of each of the voice prompts. Specifically, the vocalization processing circuit 230 may determine whether these vocalizations contain sensitive information. The sensitive information detection circuit 245 may detect an initial portion of the user's 110 home address. The speaker control circuit 250 may communicate the noise canceling signal to the speaker system 205. The speaker(s) 115 may then output the noise canceling sound to interrupt further receipt of sensitive information (e.g., the remaining portion of the user's 110 home address) by the secondary device 105.

While these example environments are shown, it should be understood that the present disclosure is not limited to the particular arrangements depicted in FIGS. 1, 3, and 4. For instance, in various embodiments, the primary device 100 may be configured to surround the secondary device 105. For instance, in some embodiments, the primary device 100 is a sound-proof cage or other structure configured to selectively permit and block sound waves from being passed to the secondary device 105. The primary device 100 may include a port for passing through a power cord of the secondary device 105, or the primary device 100 may include a power supply for supplying power to the secondary device 105. The primary device 100 may include a default setting which permits sound waves to pass through the primary device 100 to the secondary device 105. The user may speak a vocalization (e.g., "my password is . . . "), which is passed through the primary device 100 to the secondary device 105. The primary device 100 may detect the vocalization. The vocalization processing circuit 230 of the primary device 100 may analyze the vocalization to determine the contents of the vocalization. Specifically, the vocalization processing circuit 230 may determine whether the vocalization indicates forthcoming sensitive information. The sensitive information detection circuit 245 may detect the phrase "my password is," and determine that the next vocalization from the user may indicate the user's password. The primary device 100 may then block subsequent sound waves from passing through the primary device 100 to the secondary device 105.

Figure 5:
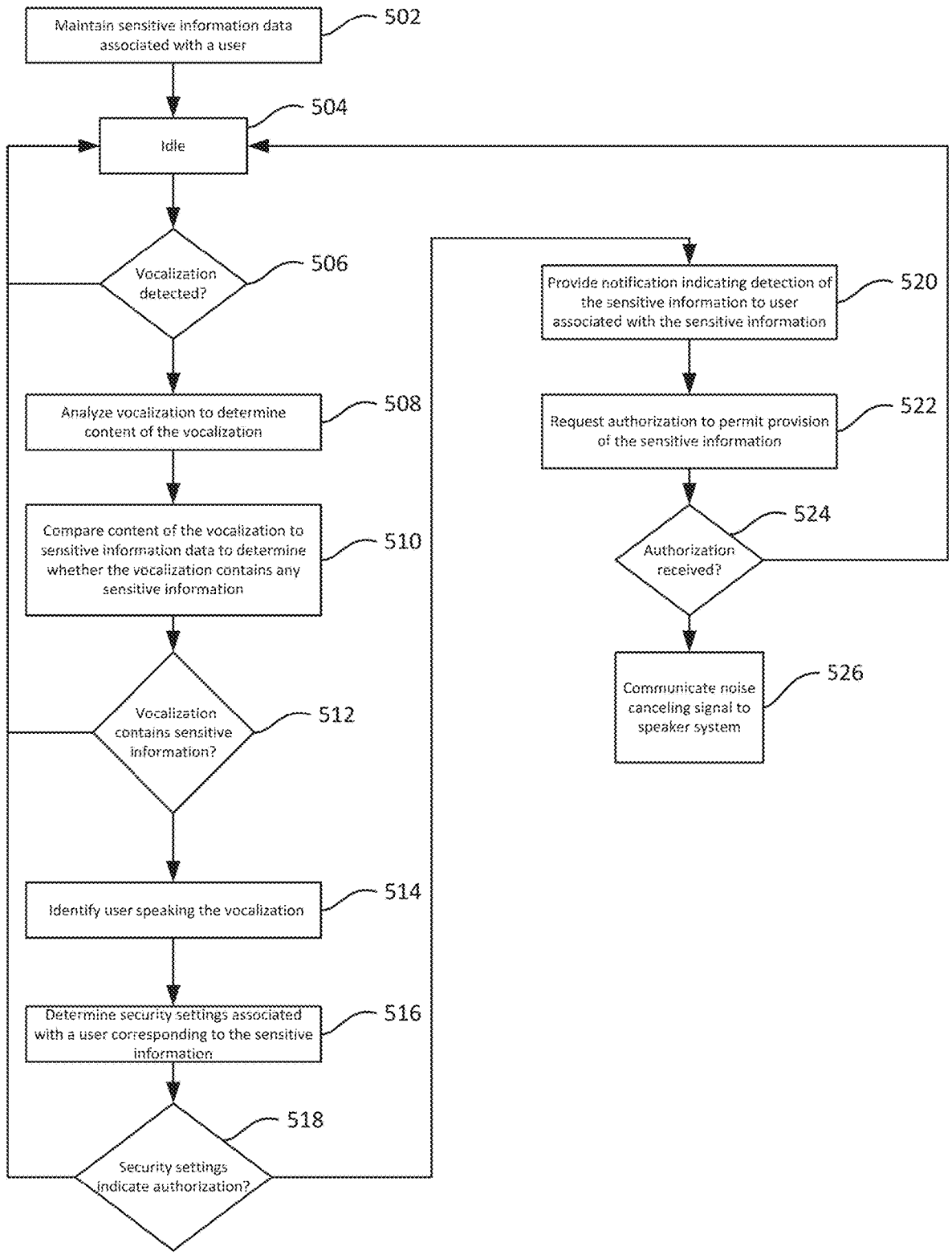
FIG. 5 is a flow chart depicting an example method of interrupting disclosure of sensitive information, according to an exemplary embodiment.

Referring to FIG. 5, a flow chart depicting an example method of interrupting disclosure of sensitive information is shown according to an exemplary embodiment. The flow chart shown in FIG. 5 provides only one example of interrupting receipt of sensitive information. Accordingly, the following disclosure should not be limited to each and every operation shown in FIG. 5. To the contrary, the method does not require each and every operation shown in FIG. 5. In some examples, the method may include additional operations. Further, the method does not need to be performed in the same chronological order shown in FIG. 5. Additionally, some operations may be performed in a different order than depicted in FIG. 5, and some operations may be performed at substantially the same time.

In some embodiments, the method 500 may start when the primary device 100 is turned on, supplied power, etc. Additionally, the method 500 may begin when a user logs onto the secure website or web portal. The method 500 may proceed to operation 502.

At operation 502, the memory 220 may store sensitive information data 225 associated with a user. The user may log onto the secure website or web portal. The user may input various sensitive information to the secure website or web portal. The sensitive information provided by the user may be encrypted and saved in memory 220 as sensitive information data 225. The method 500 may proceed to operation 504.

At operation 504, the primary device 100 may be maintained in an idle state. The primary device 100 may be maintained in an idle state until the microphone 200 generates a signal (or detects a sound) that is not filtered as background noise. The method 500 may proceed to operation 506.

At operation 506, the primary device 100 detects a vocalization. The microphone 200 may generate a signal corresponding to sound detected in the environment (such as one of the environments depicted in FIG. 1, FIG. 3, or FIG. 4). The microphone 200 may apply a filter to the signal to filter out environmental background noises. The microphone 200 may be tuned to detect vocalizations. When a vocalization is detected, the method 500 may proceed to operation 508. When a vocalization is not detected, the method 500 may loop back to operation 504, where the primary device 100 is maintained in an idle state.

At operation 508, the vocalization processing circuit 230 may analyze the vocalization detected at operation 506. The vocalization processing circuit 230 may determine the content of the vocalization. The vocalization processing circuit 230 may include an ASR system 235 to convert the vocalization to text. The vocalization processing circuit 230 may include an NLU system 240 to determine the meaning of the text. The vocalization processing circuit 230 may identify the content based on the text and the determined meaning of the vocalization. The method 500 may proceed to operation 510.

At operation 510, the sensitive information detection circuit 245 may compare the content of the vocalization (determined at operation 508) to the sensitive information data 225 (maintained at operation 502). The sensitive information detection circuit 245 may compare the content to the sensitive information data 225 to determine whether the vocalization includes any sensitive information. In some embodiments, the sensitive information may be an initial portion of a password. For instance, the sensitive information may be an initial portion of a password to an online bank account for a user. The sensitive information detection circuit 245 may compare the initial portion of the password (as represented in the sensitive information data 225) to the content of the voice to determine whether there is a match. The method 500 may proceed to operation 512.

At operation 512, the sensitive information detection circuit 245 may determine whether the vocalization contains any sensitive information. Where the initial portion of the sensitive information as represented in the sensitive information data 225 matches the content of the vocalization, the sensitive information detection circuit 245 may determine that the vocalization contains sensitive information. In some embodiments, the sensitive information detection circuit 245 may compare the number of matching characters to a threshold. The threshold may be a predetermined number of characters used to discern random vocalizations which may include individual characters to vocalizations that contain sensitive information. The threshold may be fixed or dynamic. Where the number of matching characters meets (or exceeds) the threshold, the sensitive information detection circuit 245 may determine that that vocalization contains sensitive information. Where the vocalization contains sensitive information, the method may proceed to operation 514. Where the vocalization does not contain sensitive information, the method may loop back to operation 504, where the primary device 100 is maintained in an idle state. In some embodiments, the method 500 may proceed directly to operation 526 (discussed below) when the vocalization contains sensitive information.

At operation 514, the user identification circuit 260 may identify the user who spoke the vocalization detected at operation 506. The user identification circuit 260 may identify the user based on various characteristics associated with the user. For instance, the user identification circuit 260 may identify the user based on the user's voice (using the speaker recognition system). Additionally or alternatively, the user identification circuit 260 may identify the user based on biometric features (using the biometric sensors 270). In both of these instances, the user identification circuit 260 may identify the user by comparing characteristics associated with a user profile 265 to detected characteristics which correspond to the speaker of the vocalization. The method 500 may proceed to operation 516.

At operation 516, the speaker control circuit 250 may determine the security settings based on a user profile 265. The security settings may be indicative of whether particular data entries in the sensitive information data 225 are deemed sensitive when spoken by particular users. The security settings may indicate that some sensitive information is not sensitive when spoken by particular users (such as the user corresponding to the sensitive information or other specific users). The security settings may indicate that some sensitive information is always sensitive. The security settings may indicate that some sensitive information is not sensitive when authorized by a particular user on a case-by-case basis. The method 500 may proceed to operation 518.

At operation 518, the speaker control circuit 250 may determine whether the security settings indicate authorization to permit the disclosure of the sensitive information contained in the vocalization detected at operation 506. In some instances, the security settings may indicate that the particular sensitive information in the vocalization is not sensitive when spoken by the user identified at operation 514 (e.g., that the sensitive information is authorized to be provided by the user identified at operation 514). In other instances, the security settings may indicate that the particular sensitive information in the vocalization is never sensitive (e.g., that the sensitive information is not actually sensitive). In other instances, the security settings may indicate that the particular sensitive information is not sensitive when the user specifically authorizes the disclosure (e.g., on a case-by-case basis as the user decides). Where the security settings indicate that the sensitive information is authorized to be provided, the method 500 may loop back to operation 504 where the primary device 100 is maintained in the idle state. Where the security settings indicate that the sensitive information is not authorized to be provided, the method 500 may proceed to operation 520. In some embodiments, the method 500 may proceed directly to operation 526 (discussed below) when the security settings indicate that the sensitive information is never authorized to be provided.

At operation 520, the speaker control circuit 250 may provide a notification to the user. In some embodiments, the speaker control circuit 250 may control the speaker system 205 to provide an audio notification to the speaker of the vocalization. The speaker control circuit 250 may store a notification signal which is communicated to the speaker system 205. The notification signal may be a signal that, when communicated to the speaker system 205, causes the speaker(s) 115 to output a sound that corresponds to a notification directed to the speaker. In this embodiment, the notification may alert the speaker that the speaker was disclosing sensitive information. In some embodiments, the speaker control circuit 250 may also store a display signal. The display signal may control a display 255 to output visual feedback along with the audio message (e.g., the notification may be an audio/visual notification). The method 500 may proceed to operation 522.

At operation 522, the speaker control circuit 250 may request authorization to permit the disclosure of the sensitive information. In some embodiments, the speaker control circuit 250 may control the speaker system 205 to generate a prompt requesting authorization to permit the disclosure of the sensitive information. For instance, the speaker control circuit 250 may store a prompt signal. The prompt signal may be a signal that, when communicated to the speaker system 205, causes the speaker(s) 115 to output a sound that solicits information from the speaker of the voice prompt. For instance, the sound may be an audio prompt which asks the speaker to authorize the disclosure of the sensitive information (e.g., "Do you wish to provide this sensitive information?"). The speaker may respond in natural language form (e.g., "Yes, I want to proceed."). The speaker's response may be detected by the microphone 200 and interpreted by the vocalization processing circuit 230.

In some embodiments, operation 520 and operation 522 may be performed remotely from the primary device 100. For instance, a specific user (other than the speaker) may receive a notification on their mobile device which indicates that a vocalization contained sensitive information. The notification may include, for instance, authorize and block buttons which either authorize or deny authorization of the disclosure of the sensitive information. In this regard, the user may authorize (or deny authorization of) the disclosure of sensitive information remotely from the primary device 100. The method 500 may proceed to operation 524.

At operation 524, the speaker control circuit 250 may determine whether authorization was received (from the request provided at operation 522). If authorization is received, the method 500 may loop back to operation 504, where the primary device 100 is maintained in an idle state. If authorization is not received (or expressly denied), the method 500 may proceed to operation 526. In some embodiments, the speaker control circuit 250 may control the speaker system 205 to prompt the user to re-speak the sensitive information where authorization is received. The user may then speak the sensitive information to the secondary device 105 while the primary device 100 is maintained in the idle state.

At operation 526, the speaker control circuit 250 may communicate the noise canceling signal to the speaker system 205. The noise canceling signal may be a signal that, when communicated to the speaker system 205, causes the speaker(s) 115 to output a sound that interrupts or otherwise prevents receipt of sensitive information by any other devices located in the environment of the primary device 100. The speaker control circuit 250 may provide the noise canceling signal to the speaker system 205 prior to the speaker speaking the entirety of the sensitive information. Accordingly, the sensitive information detection circuit 245 may identify that vocalization contains an initial portion of sensitive information, and the speaker control circuit 250 may provide the noise canceling signal to the speaker system 205 prior to the speaker speaking the entirety of the sensitive information. The speaker(s) 115 may output the noise canceling sound which interrupts the receipt of the remaining portion of the sensitive information from the data entry. The speaker(s) 115 may output the noise canceling sound for a duration (e.g., a number of seconds, a minute, etc.) sufficient to interrupt further receipt of sensitive information by other devices in the environment of the primary device 100.

In some embodiments, the speaker control circuit 250 may determine the duration to output the noise canceling sound. The duration may be a fixed duration (e.g., 30 seconds, a minute, etc.). In some embodiments, the duration may be a function of the sensitive information. For instance, where the sensitive information is a password containing a number of characters, the speaker control circuit 250 may determine the number of characters contained in the password. The speaker control circuit 250 may store or access data corresponding to the average duration to speak a character. The speaker control circuit 250 may determine the duration based on the duration to speak a character and the number of characters contained in the password. As another example, the sensitive information may be a sentence, phrase, or word containing a number of syllables. The speaker control circuit 250 may determine the number of syllables for the sensitive information. The speaker control circuit 250 may store or access data corresponding to the average duration to speak a syllable. The speaker control circuit 250 may determine the duration based on the duration to speak a syllable and the number of syllables contained in the password.

In some embodiments, the method 500 ends following the interruption of the receipt of sensitive information. In some embodiments, the method 500 may include deactivating the noise canceling sound and proceeding back to operation 504, where the primary device 100 is maintained in an idle state. In this regard, the method 500 may loop. The primary device 100 may continuously (or near-continuously) monitor vocalizations to determine whether they contain sensitive information, and interrupt receipt of the sensitive information by other devices when sensitive information is identified in a vocalization.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the disclosures of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), a distributed ledger (e.g., a blockchain), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Ethereum, Ripple, Litecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A method comprising:
   maintaining sensitive information data associated with a user;
   receiving a vocalization at a primary device and at a secondary device;
   analyzing, by the primary device, the vocalization to determine a content of the vocalization;
   comparing the content of the vocalization to the sensitive information data to determine whether the vocalization contains at least some sensitive information; and
   selectively controlling, based on determining that the vocalization contains some sensitive information, a speaker of the primary device to output a noise canceling sound configured to prevent the secondary device from receiving any subsequently vocalized sensitive information, wherein selectively controlling the speaker comprises:
   determining the vocalization is provided by the user;
   determining a security setting based on a profile associated with the user; and
   refraining from controlling the speaker to output the noise canceling sound responsive to determining that the security setting indicates authorization to permit the disclosure of the sensitive information.

2. The method of claim 1, wherein the sensitive information comprises an initial portion of a password.

3. The method of claim 2, wherein the password is associated with a bank account for the user.

4. The method of claim 2, wherein the password includes a first portion of characters and a second portion of characters, and wherein the first portion of characters is the initial portion of the password.

5. The method of claim 4, wherein the noise canceling sound prevents the secondary device from receiving the second portion of characters of the password.

6. The method of claim 1, further comprising:
   providing, by the primary device, a notification indicating that the noise canceling sound has been output to prevent the secondary device from receiving any subsequently vocalized sensitive information; and
   prompting, by the primary device, authorization to permit the secondary device to receive the sensitive information; and
   controlling, based on receiving authorization, the speaker of the primary device to deactivate the noise canceling sound.

7. The method of claim 1, wherein determining the vocalization is provided by the user comprises:
   detecting one or more biometric features of a person who provides the vocalization;
   comparing the detected one or more biometric features to data stored that corresponds to the user; and
   determining that the person is the user based on the comparison.

8. The method of claim 1, wherein determining the vocalization is provided by the user comprises:
   detecting, via a speech analysis system, one or more voice characteristics of a person who provides the vocalization;
   comparing the one or more voice characteristics to data stored that corresponds to the user; and
   determining that the person is the user based on the comparison.

9. A system comprising:
   a microphone configured to detect voice inputs from a person to a secondary device;
   at least one speaker configured to output noise canceling sounds;
   a computing system including a processing circuit, the processing circuit including a processor and memory, the memory structured to store instructions that, when executed by the processor, cause the processor to:
   receive, by the microphone, a vocalization from the person to the secondary device;
   analyze the vocalization to determine a content of the vocalization;
   compare the content to sensitive information data associated with a user to determine whether the vocalization contains at least some sensitive information;
   control a speaker of the primary device to output a noise canceling sound based on determining that the voice input contains some sensitive information, the noise canceling sound configured to prevent the secondary device from receiving any subsequently vocalized sensitive information;

provide a notification indicating that the noise canceling sound has been output to prevent the secondary device from receiving any subsequently vocalized sensitive information;
prompt authorization to permit the secondary device to receive the sensitive information; and
control, based on the receiving authorization, the speaker to deactivate the noise canceling sound.

10. The system of claim 9, wherein the sensitive information comprises an initial portion of a password.

11. The system of claim 10, wherein the password is associated with a bank account for the user.

12. The system of claim 10, wherein the password includes a first portion of characters and a second portion of characters, and wherein the first portion of characters is the initial portion of the password.

13. The system of claim 12, wherein the noise canceling sound prevents the secondary device from receiving the second portion of characters of the password.

14. The system of claim 9, further comprising:
the secondary device, wherein the secondary device comprises a digital voice assistant.

15. The system of claim 9, wherein the memory further stores instructions that, when executed by the processor, cause the processor to:
determine the vocalization is provided by the user;
determine a security setting based on a profile associated with the user; and
refrain from controlling the speaker to output the noise canceling sound responsive to determining that the security setting indicates authorization to permit the disclosure of the sensitive information.

16. The system of claim 15, further comprising:
a biometric sensor configured to detect one or more biometric features of a person who provides vocalizations;
detecting the vocalization is provided by the user comprises:
detecting one or more biometric features of the person who provides the vocalization;
comparing the detected one or more biometric features to stored biometric data corresponding to the user; and
determining that the person is the user based on the comparison.

17. The system of claim 16, wherein the biometric sensor is at least one of a facial recognition system, an iris scanner, and a finger print scanner.

18. The system of claim 15, wherein detecting that the vocalization is provided by the user comprises:

detecting, based on the vocalization, one or more voice characteristics of the person who provides the vocalization;
comparing the detected voice characteristics to data stored that corresponds to the user; and
determining that the person is the user based on the comparison.

19. A method comprising:
maintaining sensitive information data associated with a user;
receiving a first vocalization at a primary device and at a secondary device;
analyzing, by the primary device, the first vocalization to determine a content of the first vocalization and an expected content of a second vocalization expected to be vocalized following the first vocalization;
determining that the second vocalization is expected to contain sensitive information based on at least one of a comparison of the content of the first vocalization to the sensitive information data and a context of the first vocalization;
controlling, based on determining the second vocalization is expected to contain sensitive information, a speaker of the primary device to output a noise canceling sound configured to prevent the secondary device from receiving the second vocalization;
providing a notification indicating that the noise canceling sound has been output to prevent the secondary device from receiving any subsequently vocalized sensitive information;
prompting authorization to permit the secondary device to receive the sensitive information; and
controlling, based on the receiving authorization, the speaker to deactivate the noise canceling sound.

20. The method of claim 19, wherein the context of the first vocalization indicates that a person providing the first vocalization intends to provide at least part of a password in the second vocalization.

21. The method of claim 19, wherein controlling the speaker comprises controlling, based on determining the second vocalization is expected to contain sensitive information, the speaker of the primary device to output the noise canceling sound for a duration, the noise canceling sound being output for the duration to prevent the secondary device from receiving the second vocalization.

22. The method of claim 21, wherein the duration is a fixed duration.

23. The method of claim 21, further comprising determining, based on the sensitive information, the duration for outputting the noise canceling sound.

* * * * *